(12) United States Patent
Maisch et al.

(10) Patent No.: US 6,981,429 B2
(45) Date of Patent: Jan. 3, 2006

(54) ACTUATING DEVICE, ESPECIALLY A HYDRAULIC OR PNEUMATIC ACTUATOR, FOR TRANSMISSIONS OF VEHICLES, PARTICULARLY MOTOR VEHICLES

(75) Inventors: Dieter Maisch, Kohlberg (DE); Hartmut Weber, Altdorf (DE); Alfred Trzmiel, Grafenberg (DE)

(73) Assignee: Hydraulik-Ring GmbH, Marktheidenfeld (DE)

( * ) Notice: Subject to any disclaimer, the term of this patent is extended or adjusted under 35 U.S.C. 154(b) by 0 days.

(21) Appl. No.: 10/605,123

(22) Filed: Sep. 10, 2003

(65) Prior Publication Data

US 2004/0123690 A1 Jul. 1, 2004

(30) Foreign Application Priority Data

Sep. 10, 2002 (DE) .............................. 102 43 047

(51) Int. Cl.
*F16H 59/00* (2006.01)
*F16J 1/10* (2006.01)
(52) U.S. Cl. ......................................... 74/335; 92/129
(58) Field of Classification Search ................ 74/335, 74/473.11, DIG. 1; 92/129
See application file for complete search history.

(56) References Cited

U.S. PATENT DOCUMENTS

| 4,125,059 A | * | 11/1978 | Tuji ............................. 92/129 |
| 4,784,007 A | * | 11/1988 | Ishida et al. .................. 74/335 |
| 4,846,050 A | * | 7/1989 | Sibeud et al. ................. 74/335 |
| 5,669,265 A | * | 9/1997 | Adler ........................... 74/335 |
| 6,202,812 B1 | * | 3/2001 | Semke ......................... 74/335 |
| 2004/0020315 A1 | * | 2/2004 | Vilou et al. ................... 74/7 A |

FOREIGN PATENT DOCUMENTS

| EP | 487861 B1 | * | 6/1992 | |
| JP | 359089856 A | * | 5/1984 | ................. 74/335 |

* cited by examiner

*Primary Examiner*—Roger Pang
(74) *Attorney, Agent, or Firm*—Gudrun E. Huckett

(57) ABSTRACT

An actuating device for a transmission of a motor vehicle has a housing and two pistons moveably arranged in the housing. A coupling part is arranged between the two pistons and is acted on by the two pistons so as to be moved by the two pistons. The coupling part is connected to a shifting part of the transmission and is made, at least on a surface of the coupling part, of wear-resistant material. The two pistons are loosely seated on the coupling part so that these parts can align themselves properly relative to one another after mounting.

33 Claims, 5 Drawing Sheets

ACTUATING DEVICE, ESPECIALLY A HYDRAULIC OR PNEUMATIC ACTUATOR, FOR TRANSMISSIONS OF VEHICLES, PARTICULARLY MOTOR VEHICLES

BACKGROUND OF INVENTION

1. Field of the Invention

The invention relates to an actuating device, especially a hydraulic or pneumatic actuator, for transmissions of vehicles, particularly motor vehicles. The actuating device comprises a housing in which two pistons are arranged. A coupling part that is connectable to a shifting part, preferably a shift fork, is movable by means of the two pistons. The coupling part, at least at its surface, is made of a wear-resistant material, preferably steel.

2. Description of the Related Art

Known actuating devices of this kind are provided for different applications in the field of vehicle transmissions. In this connection, shift forks in the transmissions are actuated directly by a hydraulic or pneumatic actuator. The cylinder housing of these actuators are integrated into the transmission housing and are comprised of aluminum. The shift forks actuating the actuators must transmit great forces in the transmission. For this reason, the contact location relevant for the force transmission or the corresponding part of the actuator are manufactured of a hard, wear-resistant material, preferably steel. Because of leakage requirements, the weight, and the temperature behavior, the piston is comprised of the same material as the actuator or cylinder housing, i.e., is comprised of aluminum. For reasons of force transmission of the piston onto the shift fork, the piston should be made of steel. In a known actuator, the cylinder housing is integrated into the transmission housing. The piston is comprised of several parts. The parts of the piston provided with the running surface and the sealing surface of the piston are comprised of aluminum; the contact location relative to the shift fork is comprised of a steel part. A disadvantage is that the pistons are comprised of several parts wherein the running surfaces of the piston are distributed over several components. When mounting the piston, a contact member comprised of steel is inserted. Subsequently, the other piston parts comprised of aluminum are connected to one another, for example, by pressing, screwing or welding. After this connecting step, there is the danger that the running surfaces of the piston are no longer precisely aligned relative to one another; the piston therefore must be after-machined on a machine in order to comply with the predetermined geometric requirements. This is complex and expensive.

SUMMARY OF INVENTION

It is an object of the present invention to configure an actuating device of this kind such that it is comprised of only a few parts which are easy to assemble and can be aligned properly relative to one another without requiring additional after-machining.

In accordance with the present invention, this is achieved in that the two pistons are positioned loosely on the coupling parts.

As a result of the configuration according to the invention, the pistons are positioned loosely on the coupling part. Accordingly, these parts can align themselves properly relative to one another after mounting, and possibly present imprecisions can be compensated easily. Accordingly, additional after machining of the piston after mounting or assembly is not required. Moreover, when manufacturing the parts of the actuating device, it is not necessary to comply with narrow tolerances so that the manufacturing costs can be reduced. It is only necessary that the diameter of the running surfaces of the pistons are precisely machined in order to prevent leakage of the actuator as much as possible. The parts of the actuating device can be completely manufactured, for example, on a turning machine and, subsequently, can be joined and assembled to form the actuator.

DETALED DESCRIPTION

Figure 1:
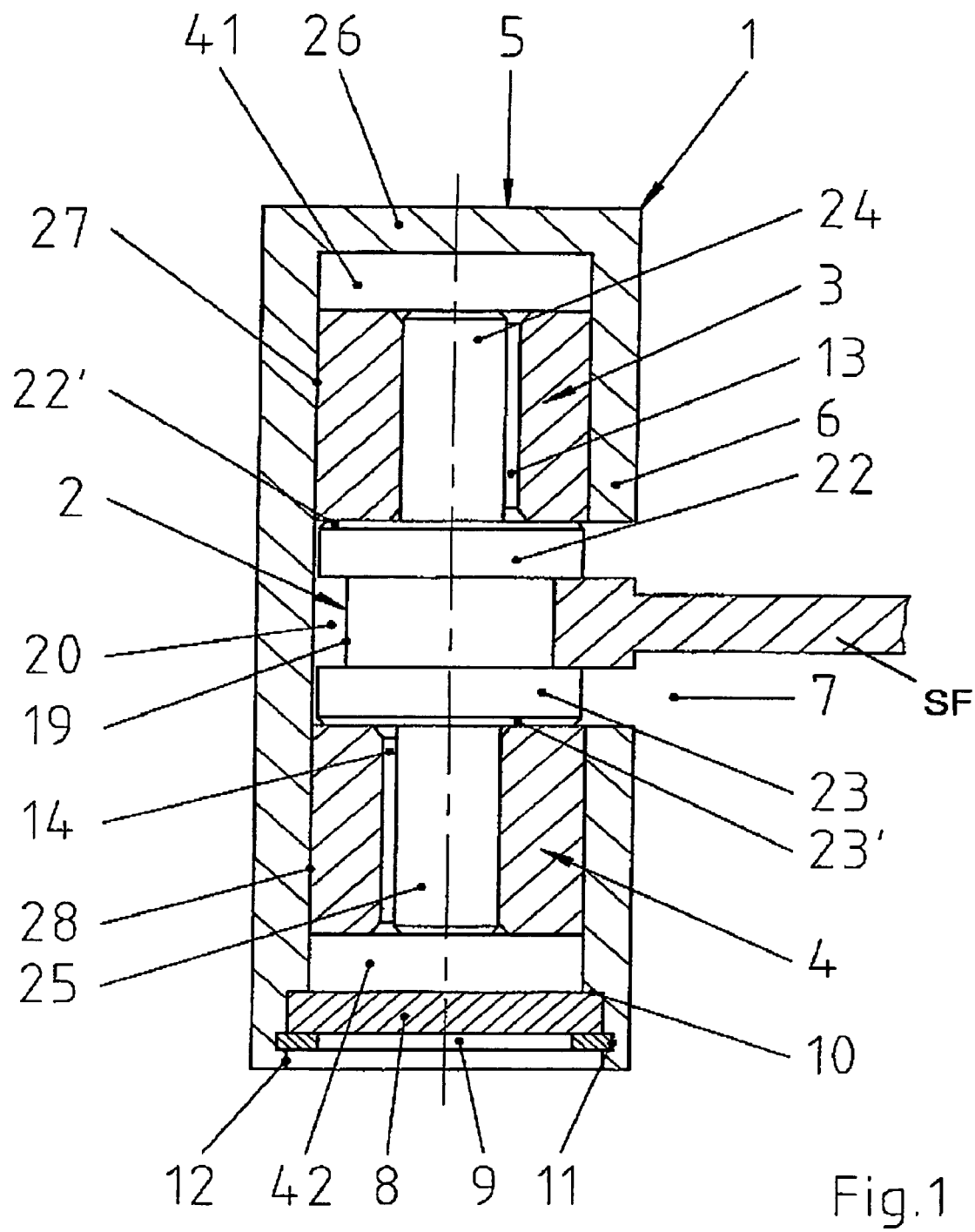
FIG. 1 shows an axial section of the actuating device according to the invention with the pistons.

The actuating devices 1 illustrated in FIGS. 1 through 5 are hydraulic or pneumatic actuators which are integrated Into a housing (not illustrated) of the transmission of motor vehicles. Such transmissions comprise a shifting part usually in the form of shift forks that are actuated by the actuators 1 in order to rotate or move the selector shaft for selecting a gutter and for selecting a gear. In the embodiment according to FIGS. 1 and 2, the shift fork SF is connected to an intermediate member 2 of the actuator 1 that is axially movable by means of two pistons 3, 4 in a cylinder housing 5. The housing 5 is comprised of light metal, preferably, aluminum, so that it has a relatively minimal weight. In the jacket 6 of the cylinder housing 5 a through opening 7 for allowing passage of the shift fork SF into the housing 5 is provided, as is known in the art. At one end face the housing 5 is closed of by a disk-shaped lid or cover 8 that is secured by a securing ring 9 in its mounted position. The cover 8 rests with its edge against a radial annular shoulder 10 on the inner wall 12 of the housing 5. The securing ring 9 is secured in an annual groove 11 on the inner wall 12 of the housing 5.

The pistons 3, 4 are in the form of identical sleeves. They are comprised also of light metal, preferably, aluminum. In comparison to the cylinder housing 5 the pistons 3, 4 have thick walls and are mounted on pin-shaped projections 24, 25 of the intermediate member 2. The coaxially positioned projections 24, 25 project from a cylindrical center member 19 acting as an engagement member for the shift fork and provided for this purpose with a centrally positioned annular groove 20 to be engaged by the shift fork. The annular groove 20 is limited axially by a flange 22, 23, respectively. The flanges 22, 23 have an outer diameter that is slightly smaller than the inner diameter of the housing 5. The projections 24, 25 adjoin centrally the end faces 22', 23' of the flanges 22, 23 facing away from one another.

In place of the annular groove 20, the center member 19 can also have two or several flattened sections.

Figure 2:
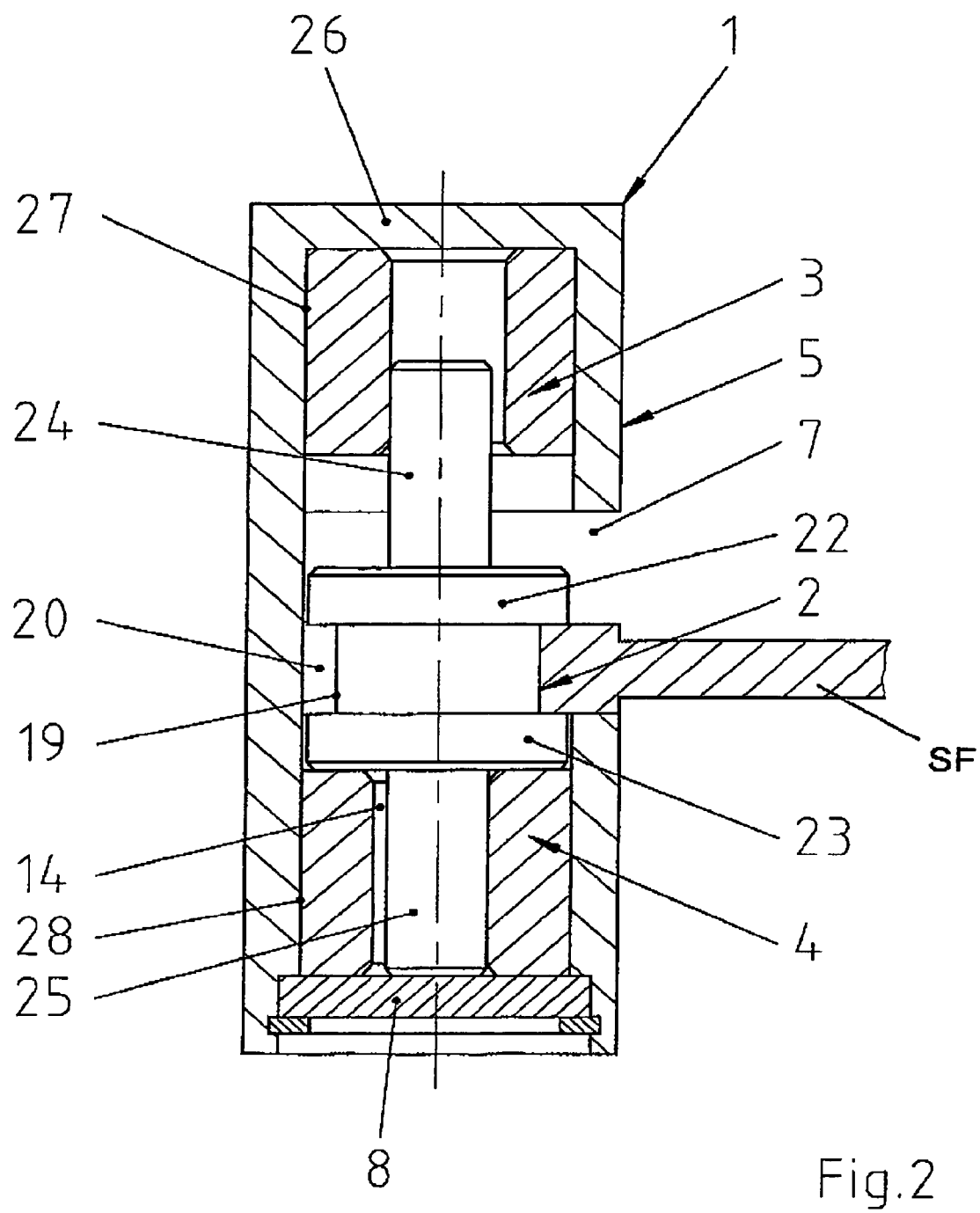
FIG. 2 is a representation corresponding to FIG. 1 showing the pistons in a different position.

The intermediate member 2 is a monolithic part and is comprised of wear-resistant material, preferably steel. The diameter of the projections 24, 25 is smaller than the inner diameter of the pistons 3, 4. In this way, the intermediate member 2 with its projections 24, 25 is positioned with radial play within the pistons 3, 4. The pistons 3, 4 and/or the intermediate member 2 must not be manufactured with narrow tolerances so that the actuator 1 can be produced inexpensively. In FIGS. 1 and 2, it is illustrated that the axial openings 13, 14 of the pistons 3, 4 are arranged off center. As a result of the described radial play, it is still ensured that the intermediate member 2 is entrained reliably by the pistons 3, 4.

The outer diameter of the pistons 3, 4 is matched to the inner diameter of the housing 5 such that the pistons 3, 4 are guided in the housing 5. The projections 24, 25 and the pistons 3, 4 are advantageously of the same length. The center member 19 is shorter than the pistons 3, 4; however, depending on the configuration and/or the application of the actuator 1, the center member 19 can be of the same length as the pistons 3, 4 or longer than the pistons 3, 4.

FIG. 1 shows the intermediate member 2 in a central position in which the center member 19 is positioned at the level of the through opening 7 of the housing 5. The axial length of the center member 19 corresponds in the illustrated embodiment to the axial width of the through opening 7.

In the area between the pistons 3, 4 and the lid or cover 8 as well as the oppositely positioned bottom 26 of the housing 5, a pressure chamber 41, 42 is provided, respectively, into which the pressure medium that can be oil or compressed air is introduced with valve control. The bores opening into the pressure chambers 41, 42 are not illustrated.

In the central position illustrated in FIG. 1, the pressure medium in both pressure chambers 41, 42 is pressurized. The surfaces of the pistons 3, 4 and of the projections 24, 25 in the pressure chamber is 41, 42 that are loaded by the pressure medium are identical. The pistons 3, 4 rest under the pressure of the pressure medium against the annular end faces 22', 23' of the flanges 22, 23. When the intermediate member 2 is to be moved, the corresponding pressure chamber 41 or 42 is pressure-relieved so that the intermediate member 2 with the corresponding piston 3 or 4 is moved in the desired direction to such an extent that the piston 3 or 4 will come to rest against the bottom 26 or the cover 8 or that a stop position is reached within the transmission before the piston 3 or 4 has reached its stop position.

FIG. 2 shows the situation where the pressure chamber 42 is pressure-relieved while the pressure medium in the pressure chamber 41 is still pressurized. In this way, the intermediate member 2 and the shift fork engaging it are moved. Relative to the through opening 7 of the housing 5, the center member 19 is in such a position that the shift fork in this moved position of the intermediate member 2 cannot collide with the edge of the through opening 7.

The size of the projections 24, 25 of the intermediate member 2, of the pistons 3, 4, and of the housing 5 is selected such that the projections 24, 25 relative to the intermediate member 2 will not disengage the corresponding piston when the piston 3, 4 is moved to the maximum extent. In FIG. 2, the piston 3 rests against the bottom 26 of the housing 5. The piston 3 is positioned at a radial spacing from the through opening 7 while the projection 24 still engages the piston 3.

With the described configuration it is ensured that the actuator 1 has only a minimal weight because the cylinder housing 5 and the pistons 3, 4 are made of light metal. The intermediate member 2 that is preferably made of steel ensures proper force transmission onto the shift fork. Since the central member 19 of the intermediate member 2 has a hard and wear-resistant surface, the shift forks in the transmission can transmit great forces without this causing a premature wear of the contact surfaces between the shift fork and the central member 19. By means of the loose arrangement of the pistons 3, 4 on the intermediate member 2, the parts of the actuating device can align themselves relative to one another and assume an optimal position relative to one another. The individual parts can be produced inexpensively because no tight tolerances must be observed when manufacturing them. Only the peripheral surfaces or running surfaces 27, 28 of the pistons 3, 4 must be precisely matched to the inner wall 12 of the cylinder housing 5 in order to keep leakage of the device 1 at a minimal level. The device parts, as a result of the described configuration, can be manufactured completely on a turning machine, joined and inserted into the actuator housing 5.

Figure 3:
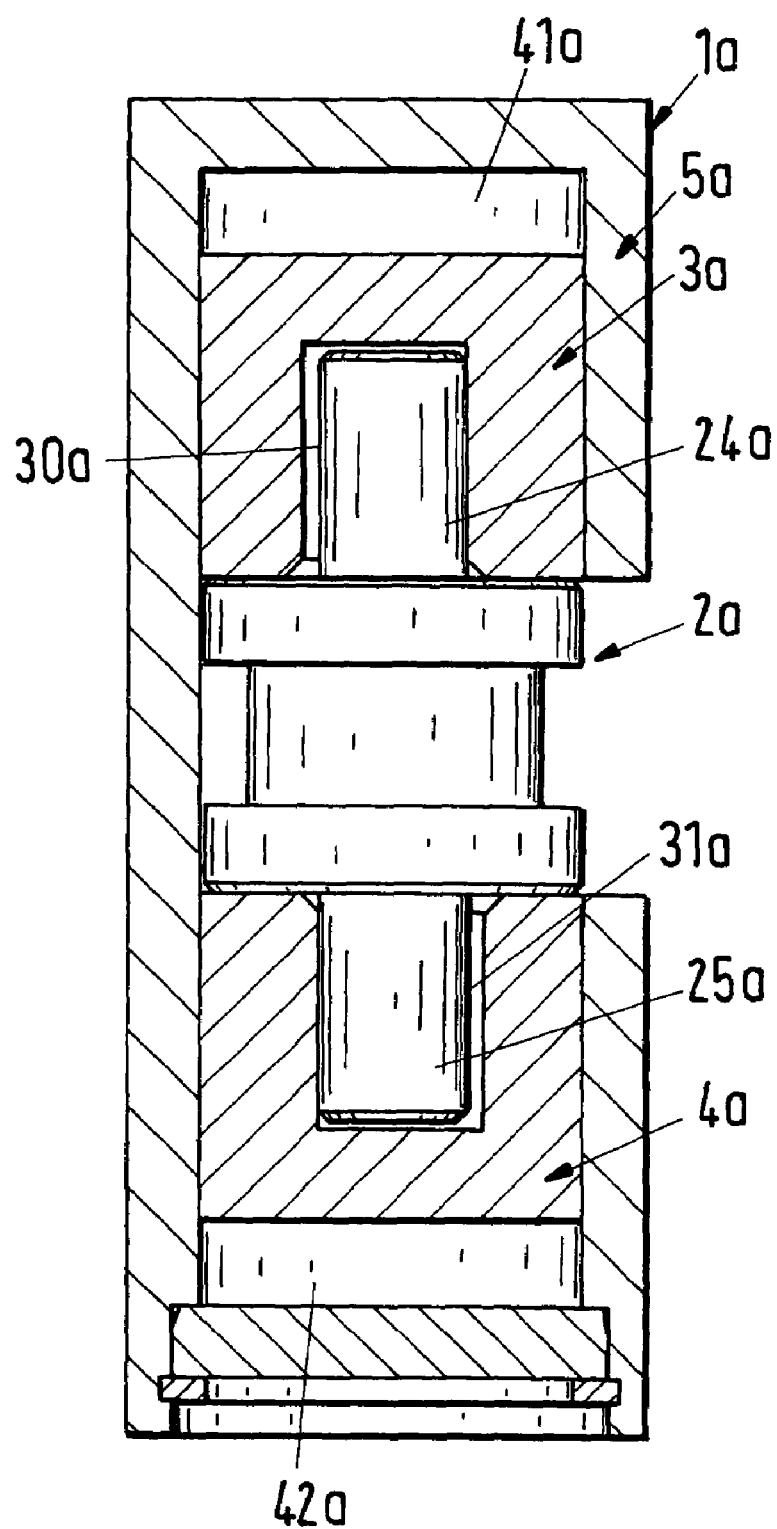
FIG. 3 shows a second embodiment of the actuating device according to the invention in a representation corresponding to FIG. 1.

The configuration according to FIG. 3 differs from the afore described configuration only in that, on the one hand, the projections 24a and 25a of the intermediate member 2a are shorter than the projections 24, 25 and, on the other hand, in that the pistons 3a, 4a are cup-shaped. Accordingly, the projections 24a, 25a project into blind bores 30a, 31a of the pistons 3a, 4a. The pistons 3a, 4a and the projections 24a, 25a have such a length that the projections cannot become disengaged from the pistons. Otherwise, the actuator 1a with its housing 5a is identical to the preceding embodiment.

Figure 4:
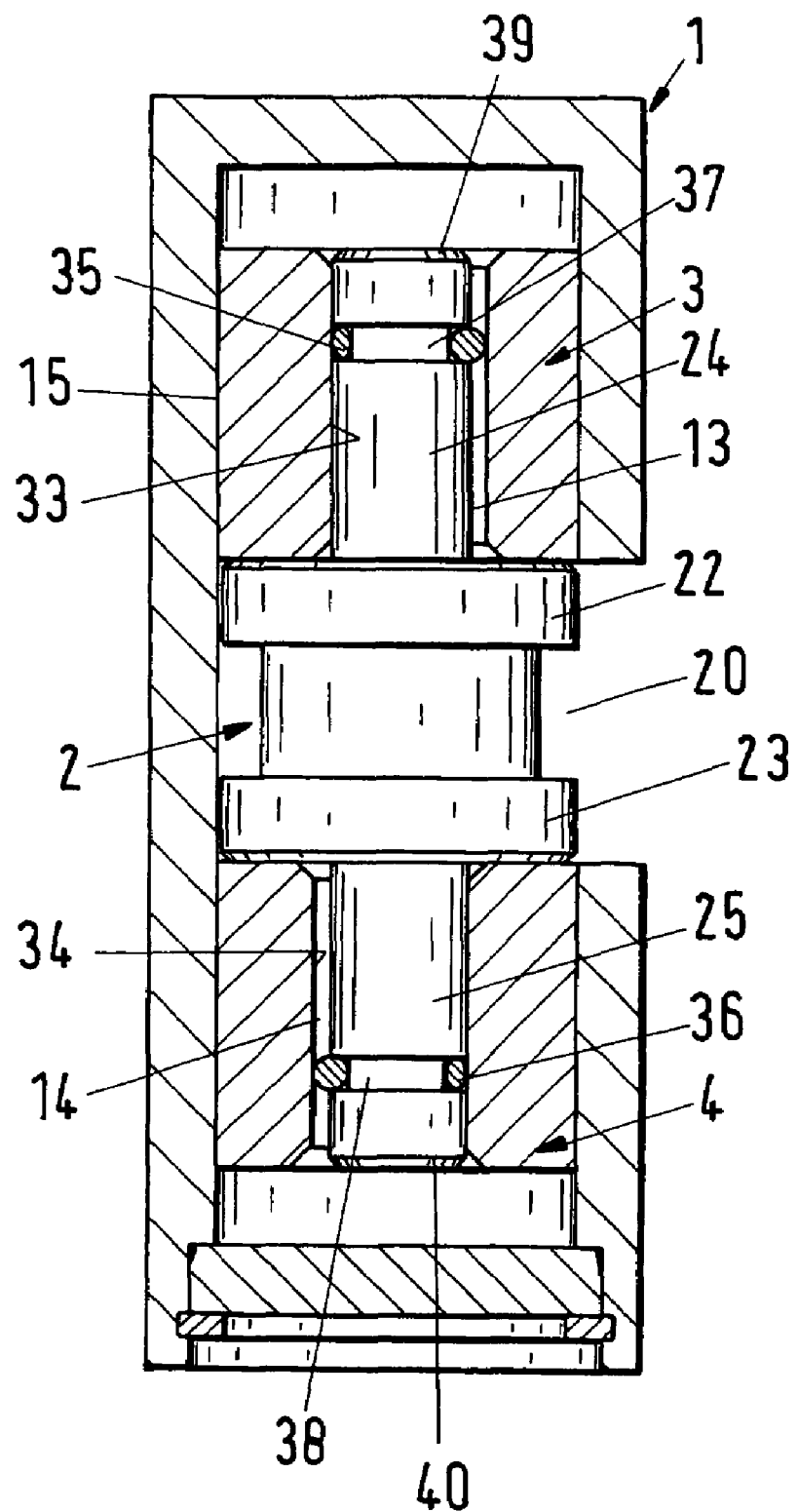
FIG. 4 shows a third embodiment of the actuating device according to the invention in a representation corresponding to FIG. 1.

The embodiment according to FIG. 4 differs from that of FIGS. 1 and 2 only in that seals 35, 36 are provided for avoiding leakage; the seals 35, 36 are formed as O-rings and are positioned in an annular groove 37, 38 of the projections 24, 25 of the pistons 3, 4, respectively. The annular grooves 37, 38 are positioned at a smaller spacing from the end faces 39, 40 of the projections 24, 25 than from the neighboring flanges 22, 23 of the center member 19 of the intermediate member 2. In the mounted position, the annular seals 35, 36 are elastically deformed and rest sealingly against the inner wall 33, 34 of the pistons 3, 4. The annular grooves can also be provided on the inner wall of the pistons 3, 4. The embodiment according to FIG. 4 is used advantageously in situations where noise should be kept at a minimum and where more stringent requirements are to be fulfilled with regard to leakage.

Figure 5:
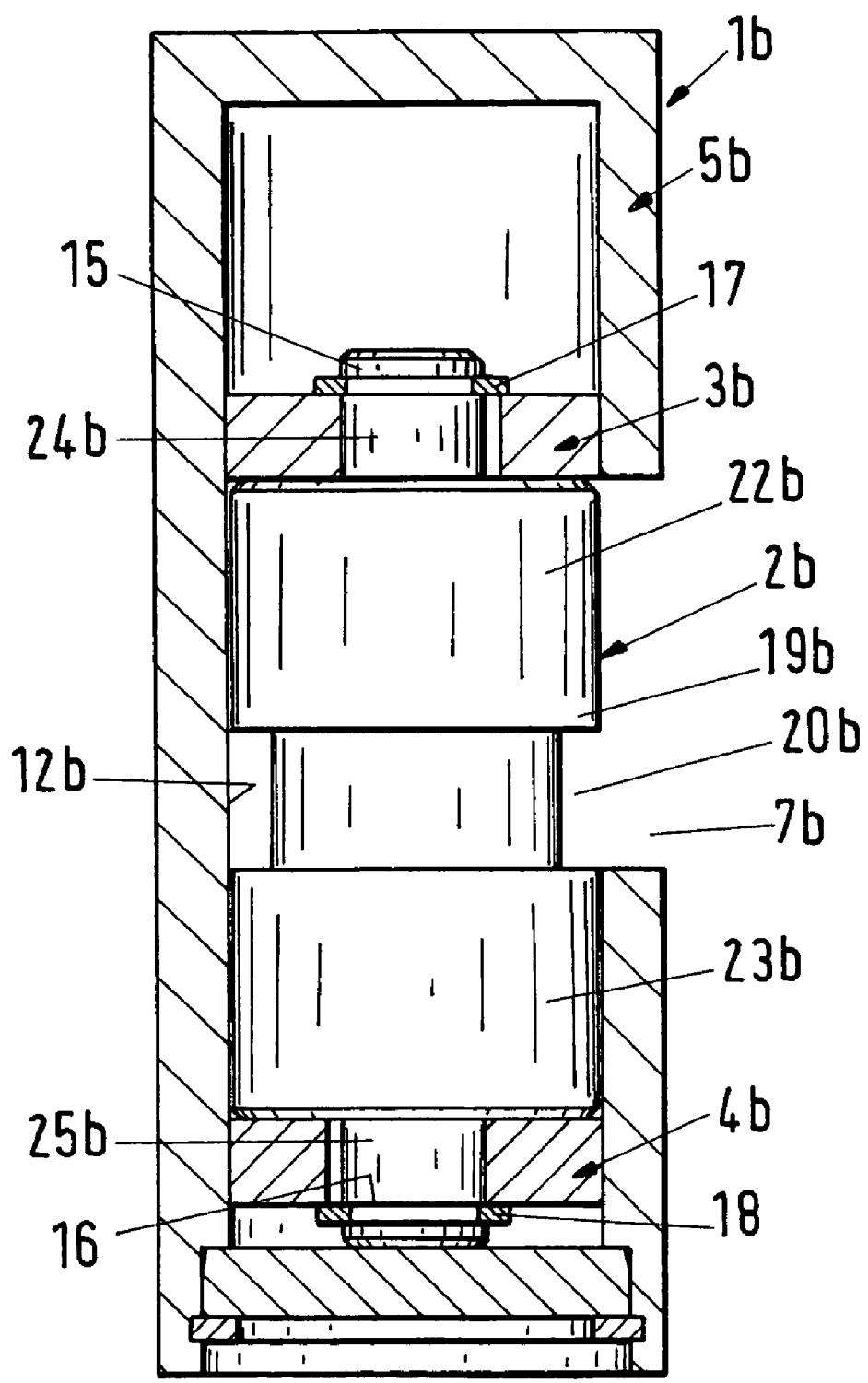
FIG. 5 shows a fourth embodiment of the actuating device according to the invention in a representation corresponding to FIG. 1.

The device 1b according to FIG. 5 differs from the afore described embodiment in that the pistons 3b, 4b are configured as relatively narrow rings and in that the intermediate member 2b has only short projections 24b, 25b but a relatively long center member 19b. The projections 24b, 25b are significantly shorter than the center member 19b and project slightly past the pistons 3b, 4b. At the projecting end, the projections 24b, 25b have an annular groove 15, 16 for receiving securing rings 17, 18, respectively; the pistons 3b, 4b are axially secured on the projections 24b, 25b by means of the securing rings 17, 18. The pistons 3b, 4b rest against the flanges 22b, 23b of the intermediate member 2b. The securing rings 17, 18 ensure that the projections 24b, 25b will not become disengaged from the pistons 3b, 4b.

The annular groove 20b of the center member 19b has approximately the same size as the in the above described embodiments. The flanges 22b, 23b are however significantly wider than in the other embodiments. The annular groove 20b is thus axially narrower than the flanges 22b, 23b. The through opening 7b of the housing 5b for the shift fork is axially wider than in the above described embodiments so that the shift fork, despite the wide flanges 22b, 23b, can project unimpededly through the through opening 7b of the housing 5b in any position of the intermediate member 2b. The intermediate member 2b is so long that the pistons 3b, 4b in any axial position of the intermediate member 2b rest against the inner wall 12b of the housing 5b and will not reach the area of the through opening 7b. Otherwise, the embodiment of FIG. 5 is identical to and operates in the same way as the preceding embodiments.

While specific embodiments of the invention have been shown and described in detail to illustrate the inventive principles, it will be understood that the invention may be embodied otherwise without departing from such principles.

What is claimed is:

1. An actuating device for a transmission of a motor vehicle, the actuating device comprising:
   a housing;
   two pistons moveably arranged in the housing;
   a coupling part arranged between the two pistons and acted on by the two pistons so as to be moved by the two pistons, wherein the coupling part is configured to connect to a shifting part of the transmission and is comprised, at least on a surface of the coupling part, of wear-resistant material;
   wherein the two pistons are loosely mounted on the coupling part so as to have radial play relative to the coupling part.

2. The device according to claim 1, wherein the two pistons are identical.

3. The device according to claim 1, wherein the coupling part comprises an engagement member for the shifting part.

4. The device according to claim 3, wherein the engagement member has axial projections and wherein the two pistons are loosely mounted on the axial projections.

5. The device according to claim 4, wherein the axial projections are aligned relative to one another.

6. The device according to claim 4, wherein the axial projections have identical length.

7. The device according to claim 3, wherein the engagement member is located at half the length of the coupling part.

8. The device according to claim 3, wherein the engagement member has at least one groove to be engaged by the shifting part.

9. The device according to claim 8, wherein the coupling part has two flanges and wherein the groove is axially limited by the two flanges.

10. The device according to claim 9, wherein the engagement member has axial projections, wherein the two pistons are loosely mounted on the axial projections, and wherein the axial projections project perpendicularly from the flanges.

11. The device according to claim 9, wherein an outer diameter of the flanges is smaller than an inner diameter of the housing.

12. The device according to claim 1, wherein the coupling part is monolithic.

13. The device according to claim 1, wherein the coupling part is made of steel.

14. The device according to claim 1, wherein the two pistons are sleeve-shaped or annular.

15. The device according to claim 1, wherein the two pistons are cup shaped.

16. The device according to claim 3, wherein the engagement member has axial projections and wherein the two pistons are loosely mounted on the axial projections, wherein the two pistons have substantially the same length as the axial projections.

17. The device according to claim 3, wherein the engagement member has axial projections and wherein the axial projections each have a securing ring, wherein the two pistons are axially secured by the securing ring on the axial projections, respectively.

18. The device according to claim 1, the coupling part has two flanges and wherein the two pistons rest, at least when under pressure load, against one of the two flanges, respectively.

19. The device according to claim 1, wherein the housing has a through opening through which through opening the shifting part passes into the housing.

20. The device according to claim 19, wherein the coupling part comprises an engagement member for the shifting part, wherein an axial width of the through opening matches approximately an axial width of the engagement member.

21. The device according to claim 20, wherein the engagement member has axial projections and wherein the two pistons are loosely mounted on the axial projections, wherein a maximum stroke of the coupling part is smaller than a guide length of the axial projections in the two pistons.

22. The device according to claim 1, wherein the two pistons consist of light metal.

23. The device according to claim 22, wherein the two pistons consist of aluminum.

24. The device according to claim 1, wherein the housing consists of light metal.

25. The device according to claim 24, wherein the housing consists of aluminum.

26. The device according to claim 1, wherein the coupling part comprises an engagement member for the shifting part, wherein the engagement member has axial projections and wherein the two pistons are loosely mounted on the axial projections, further comprising seals arranged inside the two pistons between the axial projections and an inner wall of the two pistons, respectively.

27. The device according to claim 26, wherein the seals are round seals.

28. The device according to claim 26, wherein the seals are arranged in annular grooves of the axial projections or annular grooves of the two pistons.

29. The device according to claim 1, wherein the housing has a first end formed by a bottom and a second open end closed by a cover.

30. The device according to claim 29, wherein a first one of the two pistons is arranged adjacent to the bottom and a second one of the two pistons is arranged adjacent to the cover of the housing, wherein the first piston and the bottom define a first pressure chamber and wherein the second piston and the cover define a second pressure chamber.

31. The device according to claim 1, wherein the device is a hydraulic actuator or a pneumatic actuator.

32. The device according to claim 1, wherein the wear-resistant material is steel.

33. The device according to claim 1, wherein the shifting part is a shift fork.

* * * * *